United States Patent
Chaiken et al.

(10) Patent No.: US 7,372,026 B2
(45) Date of Patent: May 13, 2008

(54) SYSTEM FOR REPOSITIONING A MICROFABRICATED CANTILEVER

(75) Inventors: Alison Chaiken, Fremont, CA (US); Henryk Birecki, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 69 days.

(21) Appl. No.: 11/128,661

(22) Filed: May 13, 2005

(65) Prior Publication Data
US 2006/0255266 A1 Nov. 16, 2006

(51) Int. Cl.
*G21K 7/00* (2006.01)
(52) U.S. Cl. ......... 250/309; 250/306
(58) Field of Classification Search ......... 250/309
See application file for complete search history.

(56) References Cited

U.S. PATENT DOCUMENTS

| | | | |
|---|---|---|---|
| 5,908,981 A | | 6/1999 | Atalar et al. |
| 5,923,166 A | * | 7/1999 | Naughton et al. ......... 324/244 |
| 6,074,890 A | * | 6/2000 | Yao et al. ......... 438/52 |
| 6,590,401 B1 | * | 7/2003 | Hildebrandt ......... 324/673 |
| RE39,833 E | * | 9/2007 | Mitchell et al. ......... 385/18 |
| 2003/0027351 A1 | * | 2/2003 | Manalis et al. ......... 436/165 |
| 2003/0160170 A1 | * | 8/2003 | McMaster et al. ......... 250/306 |
| 2004/0038426 A1 | * | 2/2004 | Manalis ......... 436/514 |
| 2005/0276726 A1 | * | 12/2005 | McGill et al. ......... 422/96 |

OTHER PUBLICATIONS

Horenstein, M.N. et al., "Differential Capacitive Position Sensor for Planar MEMS Structures with Vertical Motion", Sensors and Actuators, 2000, vol. 80, pp. 53-61.
Shusteff, M., "A Microfabricated Hollow Cantilever Sensor for Sub-nanoliter Thermal Measurements", Massachusetts Institute of Technology, Sep. 2003.
Torres, F.E. et al., "Enthalpy Arrays", Proceedings of the National Academy of Sciences, vol. 101, p. 9517-9522, Jun. 2004.
www.microcalorimetry.com, download, May 13, 2005.
Cooper, M.A., "Label-Free Screening of Bio-Molecular Interactions", Anal Bioanal Chem, 2003, p. 834-842.
Garden, J. L. et al., "Highly Sensitive AC Nanocalorimeter for Microliter-Scale Liquids of Biological Samples", Applied Physics Letters, May 2004, vol. 84, No. 18.
Olsen, E. A. et al., "Scanning Calorimeter for Nanoliter-Scale Liquid Samples", Applied Physics Letters, Oct. 2000, vol. 77, No. 17.

* cited by examiner

*Primary Examiner*—Robert Kim
*Assistant Examiner*—Phillip A. Johnston

(57) ABSTRACT

A system for repositioning a microfabricated cantilever includes a microfabricated cantilever, a first device operable to detect a position of the microfabricated cantilever, and a second device. The first device is operable to determine an offset in the position of the microfabricated cantilever, and the second device is operable to reposition the microfabricated cantilever based on an offset detected by the first device.

20 Claims, 6 Drawing Sheets

SYSTEM FOR REPOSITIONING A MICROFABRICATED CANTILEVER

BACKGROUND

Certain chemical reactions and phase transitions involve either absorption or loss of heat. Often the absorption or loss of heat is difficult to detect because of the relatively small change in temperature that results from the phase transition or chemical reaction. Conventional instruments are often incapable of measuring small changes in temperature due to a chemical change, such as a chemical reaction, a binding reaction, or protein denaturation.

Isothermal calorimetry (ITC) has been used to measure the heat that is evolved or absorbed during a mixing-induced chemical reaction. Differential scanning calorimetry (DSC) is used to measure the heat that is evolved or absorbed due to a thermally induced phase transition. Conventional studies using ITC and DSC often use large, expensive benchtop devices that require large sample volumes. Conventional instrumentation used for ITC and DSC typically lacks the sensitivity to detect changes in temperature due to the occurrence of chemical reactions or phase transitions in small sample volumes. The production of large volumes of reagents is inconvenient and expensive and is fundamentally incompatible with the combinatorial discovery methods that are increasingly used in microbiology and drug discovery.

A relatively simple and inexpensive device capable of accurately measuring temperature changes due to chemical reactions and phase transitions in smaller volumes would therefore be beneficial.

SUMMARY

A system for repositioning a microfabricated cantilever is disclosed herein. The system includes a microfabricated cantilever, a first device operable to detect a position of the microfabricated cantilever, wherein the first device is operable to determine an offset in the position of the microfabricated cantilever, and a second device operable to reposition the microfabricated cantilever based on a detected offset.

BRIEF DESCRIPTION OF THE DRAWINGS

Embodiments are illustrated by way of example and not limitation in the accompanying figures in which like numeral references refer to like elements, and wherein.

DETAILED DESCRIPTION

For simplicity and illustrative purposes, the principles of the embodiments are described. However, one of ordinary skill in the art would readily recognize that the same principles are equally applicable to, and can be implemented with variations that do not depart from the true spirit and scope of the embodiments. Moreover, in the following detailed description, references are made to the accompanying figures, which illustrate specific embodiments.

Figure 1:
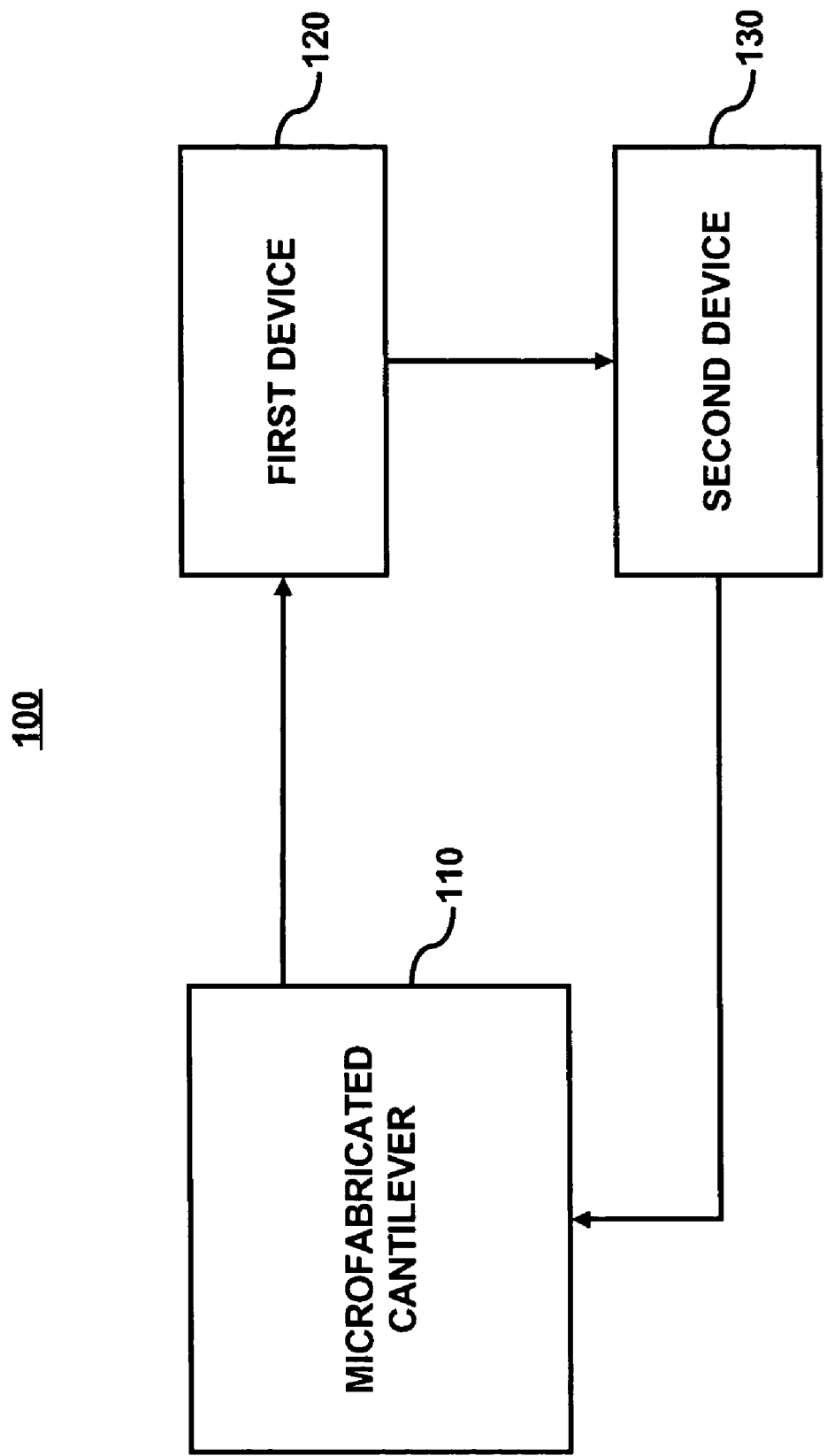
FIG. 1 shows a diagram of a system for repositioning a microfabricated cantilever, according to an embodiment.

Referring to FIG. 1, there is shown a system 100 for repositioning a microfabricated cantilever. The system 100 includes a microfabricated cantilever 110. The microfabricated cantilever 110 may be coated on at least one side with at least one reflective metal or film (not shown), such that the microfabricated cantilever 110 operates as a temperature-sensing bimorph. The coated cantilever device is a temperature-sensitive bimorph, namely a bilayer comprising two different materials with different coefficients of expansion. As a temperature-sensing bimorph, the microfabricated cantilever 110 may change position upon sensing a change in temperature. The microfabricated cantilever 110 may be fabricated out of silicon nitride, aluminum oxide, or other suitable material or combination of materials. The microfabricated cantilever 110 may also be fabricated on a micron scale, or on a sub-micron scale. For example, the cantilever 110 may have a size on the order of a few square microns up to tens of square microns. According to one example, the system 100 may operate to detect a chemical reaction or a phase transition that occurs during a differential scanning calorimetry operation.

The system 100 also includes a first device 120 operable to detect a position of the microfabricated cantilever 110. The first device 120 may also be operable to determine an offset in the position of the microfabricated cantilever 110. For instance, the first device 120 may determine an offset in the position of the microfabricated cantilever 110 by comparing the detected position with a baseline position of the microfabricated cantilever 110. The first device 120 may include at least one optical sensor located and configured to detect the position of the microfabricated cantilever 110. The first device 120 may also include logic means for comparing the detected position to the baseline position.

The system 100 also includes a second device 130 operable to reposition the microfabricated cantilever 110 based on the offset detected by the first device 120. Various configurations and operations of the first device 120 and the second device 130 are described in greater detail herein below.

Figure 2A:
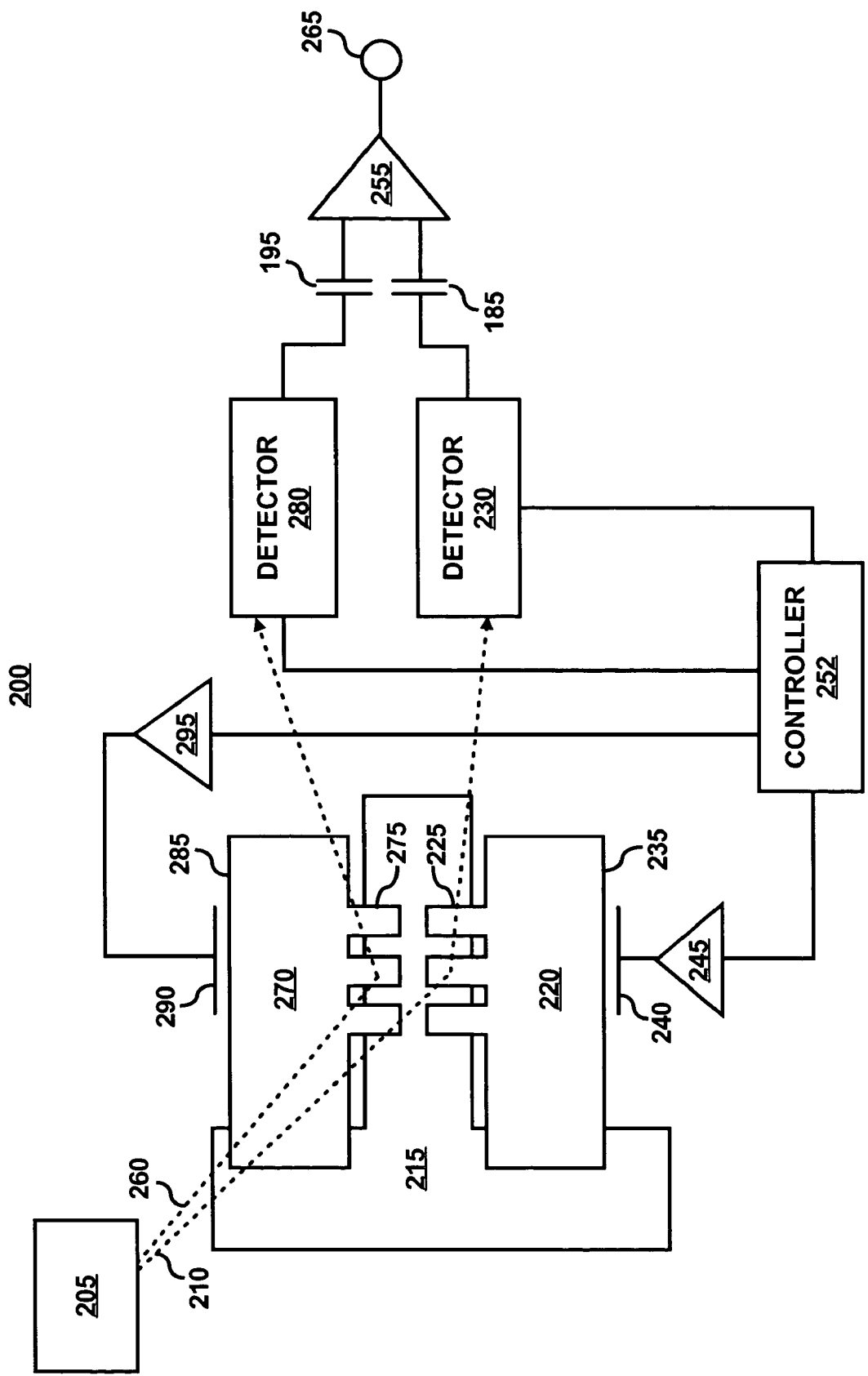
FIG. 2A shows a system for repositioning a pair of microfabricated cantilevers, according to an embodiment.

Referring to FIG. 2A, there is shown a system 200 including a first microfabricated cantilever 220 and a second microfabricated cantilever 270. The system 200 is one, more detailed, example of the system 100 shown in FIG. 1. As shown, the system 200 includes a light source 205, for instance, a laser diode for emitting a first beam of light 210 and second beam of light 260. The system 200 also includes a base 215 attached to the first microfabricated cantilever 220 and to the second microfabricated cantilever 270. The microfabricated cantilever 220 may comprise the microfabricated cantilever 110 depicted in FIG. 1.

The first microfabricated cantilever 220 and the second microfabricated cantilever 270 may each be coated on at least one side with at least one reflective metal or film (not shown), to operate as a temperature-sensing bimorph. The temperature-sensitive bimorph may include a bilayer (not shown), for instance, a bilayer comprising two different materials with different coefficients of expansion. As described in further detail below, as temperature-sensing bimorphs, the first microfabricated cantilever 220 and the second microfabricated cantilever 270 may each change position upon sensing a change in temperature.

The base 215 may include a fixed or stationary base attached to one end of the first microfabricated cantilever 220 and also attached to one end of the second microfabricated cantilever 270. The base 215 may be fabricated from a suitable integrated circuit material, for instance, silicon, silicon oxide or silicon nitride. The base 215 may also be fabricated using a material having a low thermal conductance. Each of the first microfabricated cantilever 220 and the second microfabricated cantilever 270 may comprise one or more films, of which one or more of the films also forms the base 215. Each of the first microfabricated cantilever 220 and the second microfabricated cantilever 270 may be made using either an additive or subtractive (bulk or surface) MEMS fabrication method.

The base 215 and each of the first microfabricated cantilever 220 and the second microfabricated cantilever 270 may also be fabricated using a material having a low thermal conductance. As described in further detail below, for differential scanning calorimetry (DSC) applications, heat that is evolved or absorbed due to a thermally induced phase transition is measured. Thus, for DSC applications, it may be desirable to fabricate the base 215 using a material having a low thermal conductance. A material having a low thermal conductance may be desirable because of one or more characteristics of the material, including an attenuation of leakage of evolved heat from a thermally induced phase transition or chemical reaction. This attenuation of heat leakage may be desirable, given that heat leakage in the calorimeter system 200 may reduce a signal produced by the phase transition or chemical reaction, and thereby reduce the sensitivity of the system 200 to detecting the phase transition or chemical reaction.

The first microfabricated cantilever 220 and the second microfabricated cantilever 270 may each comprise deposited polycrystalline silicon nitride, aluminum oxide, bonded bulk silicon, deposited polysilicon, deposited SU-8 polymer or another suitable material or combination of materials. In addition, each of the first microfabricated cantilever 220 and the second microfabricated cantilever 270 may be fabricated on a micron scale, or on a sub-micron scale. For example, the first microfabricated cantilever 220 may have a size on the order of a few square microns up to tens of square microns. The first microfabricated cantilever 220 may also include one or more projections or fingers 225 which are used in interferometric detection.

In addition, the first microfabricated cantilever 220 may include an interior channel that is substantially hollow. For instance, each of the first microfabricated cantilever 220 and the second microfabricated cantilever 270 may include a substantially hollow portion in which an analyte may be placed for differential scanning analysis, or in which one or more reagents may be placed for undergoing a chemical reaction. The second microfabricated cantilever 270 may also include one or more fingers 275. The fingers 225 and the fingers 275 need not be hollow or substantially hollow, and thus need not be used as a reaction chamber. The cantilever 270 may also include a substantially hollow portion in which a buffer or control solution may be placed for conducting a control measurement, as described in further detail below.

The interdigitated fingers 225 may be formed as part of the lithographic definition of the first microfabricated cantilever 220. Similarly, the interdigitated fingers 275 may be formed as part of the lithographic definition of the second microfabricated cantilever 270. The spacing between each of the fingers 225 and each of the fingers 275 may be varied as needed or desired.

The system 200 also includes a first detector 230, a first coupling capacitor 185, a controller 252, a first capacitive actuator 240, a first buffer amplifier 245, a lock-in amplifier 255, and a measurement output module 265. The system 200 also includes a second detector 280, a second coupling capacitor 195, a second capacitive actuator 290, and a second buffer amplifier 295. The first capacitive actuator 240 and the second capacitive actuator 290 may comprise parallel plate capacitors. In addition, one skilled in the art will recognize that the system 200 may also include other features or components in addition to those shown and described with reference to FIG. 2A.

The first detector 230 is operable to detect a position of the first microfabricated cantilever 220 through use of at least one optical sensor (not explicitly shown). The first detector 230 may also be used to detect an offset in the position of the first microfabricated cantilever 220. The first detector 230 may determine an offset by detecting, for instance, a change in the angle of light 210 that is reflected from the first microfabricated cantilever 220. By way of example, a deflection or change in the position of the first microfabricated cantilever 220 may produce a change in the position of the first microfabricated cantilever 220 relative to the base 215. The change in the position of the first microfabricated cantilever 220 may, in turn, produce a change in the angle of light 210 that is reflected from the first microfabricated cantilever 220. The reflected light 210 may, in turn, be detected by the first detector 230. Alternatively, the interferometer formed by the fingers on the cantilevers may generate a large change in reflectivity due to a small deflection of the bimorph. If the first cantilever's hollow reaction chamber contains an analyte and the second cantilever's reaction chamber contains a buffer, then the difference in deflection between the two devices will give information about a phase transition in the analyte.

The second detector 280 is operable to detect a position of the second microfabricated cantilever 270. The second detector 280 may include at least one optical sensor (not explicitly shown) which may be used to determine an offset in the position of the second microfabricated cantilever 270. The second detector 280 may determine an offset by detecting, for instance, a change in the angle of light 260 that is reflected from the second microfabricated cantilever 270. For instance, a deflection or change in the position of the second microfabricated cantilever 270 may produce a change in the position of the second microfabricated cantilever 270 relative to the base 215. The change in the position of the second microfabricated cantilever 270 may, in turn, produce a change in the angle of light 260 that is reflected from the second microfabricated cantilever 270.

By way of example, the first capacitive actuator 240, the first buffer amplifier 245, and the controller 252 together may form a first capacitive deflection-nulling servo system. An example of an operation of the first capacitive deflection-nulling servo system is described in further detail below. The function of the deflection-nulling system is to hold the position of the bimorph within a range where the interferometer signal is sensitive and linear. Without the nulling system, a sensitive interferometer would go out of range before the thermal scan reached the temperature where the phase transition of interest occurs.

In response to detecting an offset in the position of the first microfabricated cantilever 220, a voltage is supplied to the first capacitive actuator 240, where the voltage is based upon the detected offset. The first detector 230 may be configured to control the magnitude of the voltage supplied to the first capacitive actuator 240. The controller 252 may also operate to control the voltage that is supplied to the first capacitive actuator 240. This voltage may be referred to as a control voltage. For example, the controller 252 may control the voltage that is supplied to the first capacitive actuator 240 by comparing a detected position of the first microfabricated cantilever 220 with a baseline position, determining if there is an offset in the position of the first microfabricated cantilever 220, and supplying an appropriate voltage to correct for the detected offset.

The control voltage from the controller 252 may be amplified by the first buffer amplifier 245 prior to reaching the first capacitive actuator 240. The first capacitive actuator 240 may include a parallel plate that is substantially parallel to an edge 235 of the first microfabricated cantilever 220. As described in further detail below, with regard to one operation of the system 200, the first capacitive actuator 240 may also include a set of interdigitated fingers (not shown) similar in configuration to the fingers 225 of the first microfabricated cantilever 220. Thus, the controller 252, the first buffer amplifier 245, and the first capacitive actuator 240 may together form a first capacitive deflection-nulling servo system for correcting an offset in the position of the first microfabricated cantilever 220. In like manner, the controller 252, the second buffer amplifier 295, and the second capacitive actuator 290 together form a second capacitive deflection-nulling servo system for correcting an offset in the position of the second microfabricated cantilever 270.

Information regarding the position of the first microfabricated cantilever 220 may be used to determine whether the position of the first microfabricated cantilever 220 is offset from a baseline position. More particularly, the controller 252 may compare the detected position of the first microfabricated cantilever 220 with the baseline position to determine whether there is an offset. In addition, the controller 252 may operate to correct for the detected offset. In a similar manner, information regarding the position of the second microfabricated cantilever 270 may be used to determine whether the position of the second microfabricated cantilever 270 is offset from a baseline position.

Figure 2B:
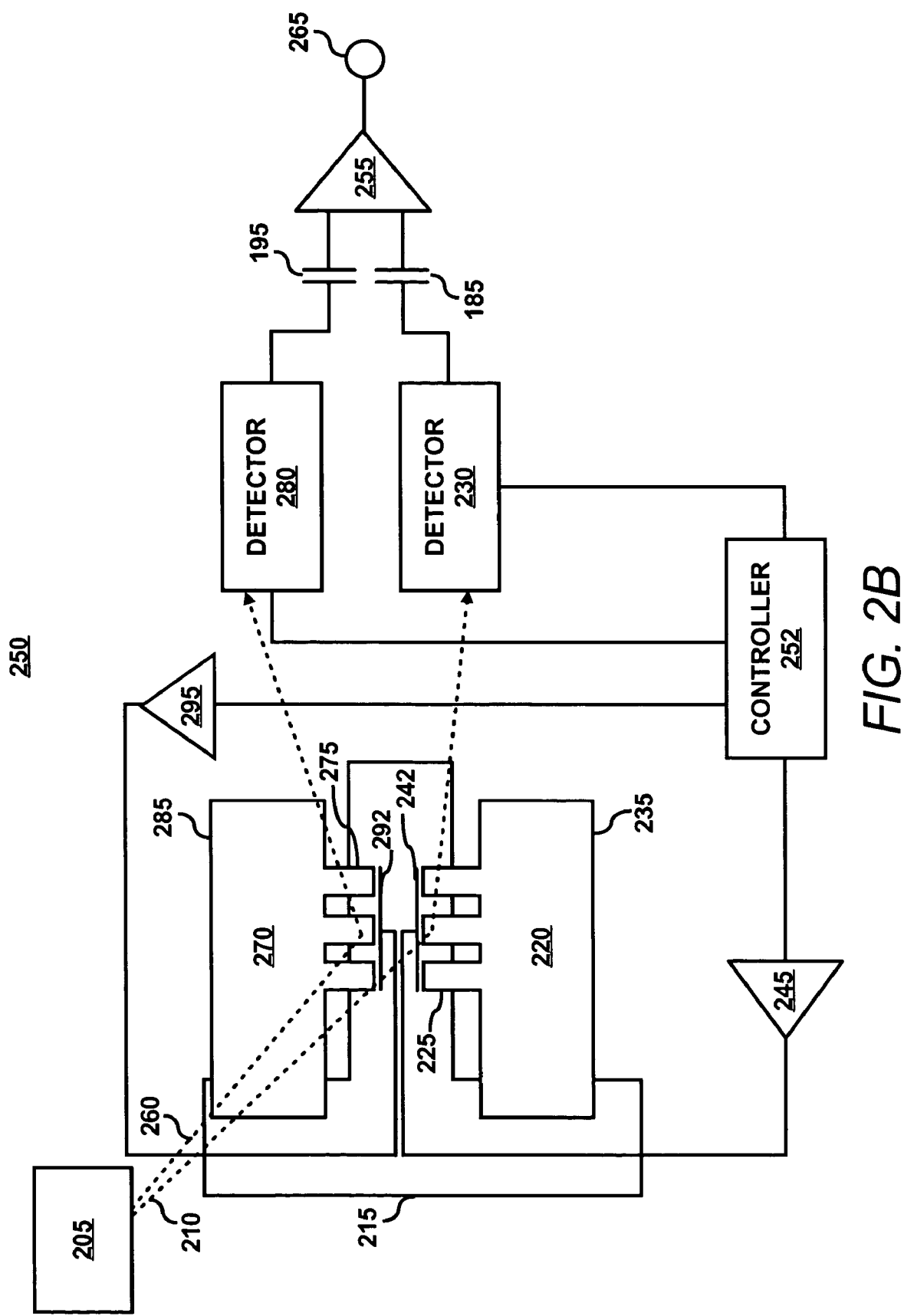
FIG. 2B shows a system for repositioning a pair of microfabricated cantilevers, according to another embodiment.

Referring to FIG. 2B, there is shown a system 250 including a first microfabricated cantilever 220 and a second microfabricated cantilever 270. The system 250 is another, more detailed, example of the system 100 shown in FIG. 1. As shown, the system 250 includes a light source 205, for instance, a laser diode for emitting a first beam of light 210 and a second beam of light 260. The system 250 also includes a base 215 attached to the first microfabricated cantilever 220 and the second microfabricated cantilever 270, as described and shown with reference to FIG. 2A. In addition to the base 215, the other like-numbered reference numerals, as described above with reference to FIG. 2A, also apply with reference to FIG. 2B.

The system 250 also includes a controller 252, a first buffer amplifier 245, and a first interdigitated finger capacitive actuator 242. In addition, the system 250 includes a second buffer amplifier 295 and a second interdigitated finger capacitive actuator 292. The first interdigitated finger capacitive actuator 242 and the second interdigitated finger capacitive actuator 292 are shown in schematic form. One skilled in the art will recognize that interdigitated finger actuators, such as those shown in FIG. 2B, may include other features. For example, the interdigitated finger actuators, such as those shown in FIG. 2B, may include interdigitated signal fingers and sense fingers, as described, for instance, by Horenstein M. N. et al., "Differential capacitive position sensor for planar MEMS structures with vertical motion" in *Sensors and Actuators*, 2000, volume 80, pages 53-61.

By way of example, the first interdigitated finger capacitive actuator 242, the first buffer amplifier 245, and the controller 252 together may form a first interdigitated capacitive deflection-nulling servo system for correcting an offset in the position of the first microfabricated cantilever 220. An appropriate voltage may thus be applied to the first interdigitated capacitive deflection-nulling servo system for correcting the offset in the position of the first microfabricated cantilever 220. Also by way of example, the second interdigitated finger capacitive actuator 292, the second buffer amplifier 295, and the controller 252 together may form a second interdigitated capacitive deflection-nulling servo system for correcting an offset in the position of the second microfabricated cantilever 270. An appropriate voltage may be applied to the second interdigitated capacitive deflection-nulling servo system for correcting the offset in the position of the second microfabricated cantilever 270.

The function of the first interdigitated capacitive deflection-nulling servo system and the second interdigitated capacitive deflection-nulling servo system function, as shown in FIG. 2B, is thus similar to the function of the first capacitive actuator 240 and the second capacitive actuator 290, as described above with reference to FIG. 2A. One skilled in the art will recognize that the system 250 may also include other features or components in addition to those shown and described with reference to FIG. 2B.

When the first microfabricated cantilever 220 is filled with a buffer solution plus a reagent to be analyzed, for instance, an analyte, and the second microfabricated cantilever 270 is filled only with a buffer solution, the difference in offset between the first microfabricated cantilever 220 and the second microfabricated cantilever 270 as a function of scan temperature may provide information to a user about thermal properties and phase transitions of the analyte. Exact or substantially exact reproducibility in the fabrication of the first microfabricated cantilever 220 and the second microfabricated cantilever 270 may be desired for performing analyte testing. However, if exact or substantially exact reproducibility in the fabrication of the first microfabricated cantilever 220 and the second microfabricated cantilever 270 may not be attained, then use of a single reference cantilever filled only with a buffer solution may not be desired.

Figure 3:
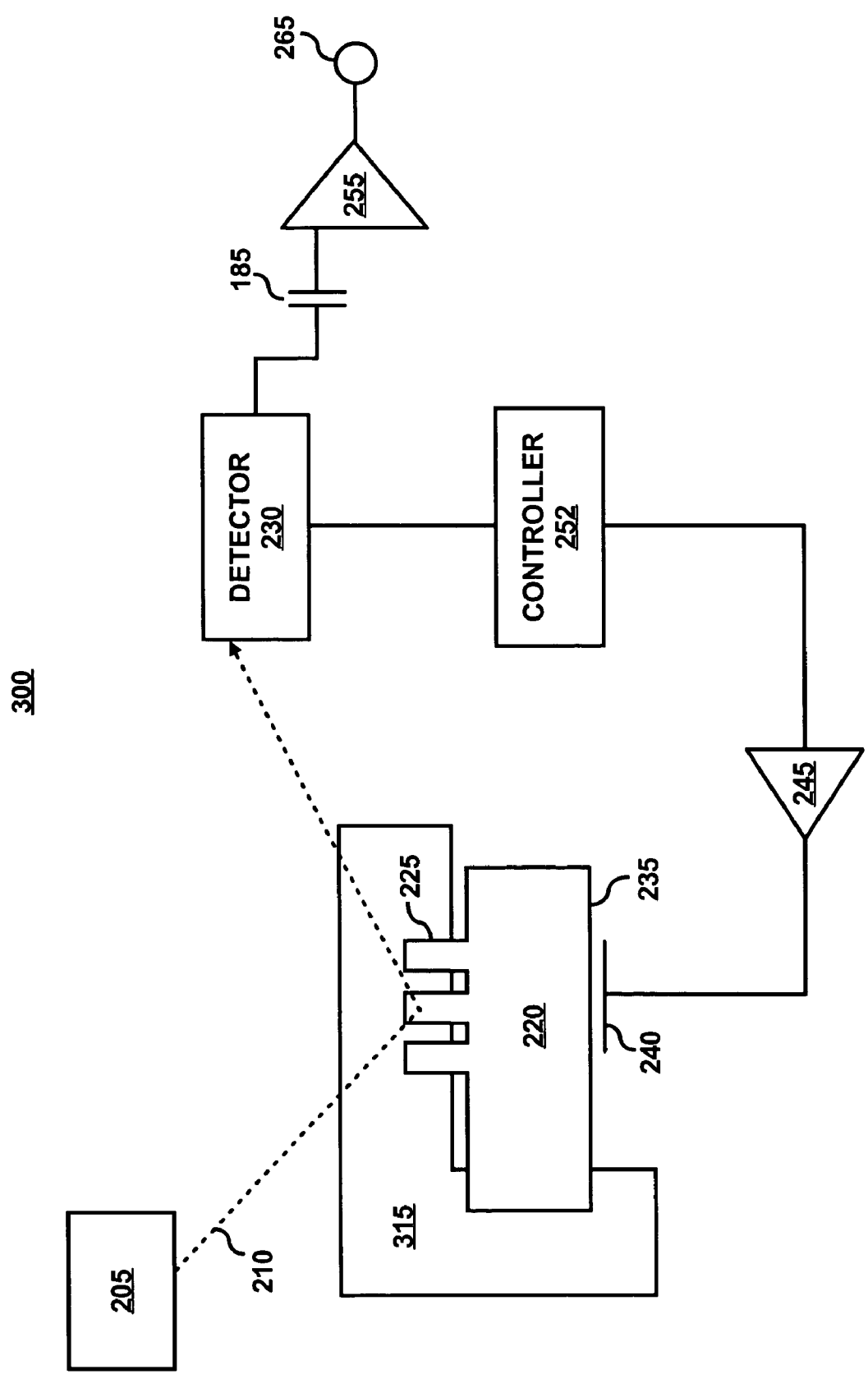
FIG. 3 shows a system for repositioning a single microfabricated cantilever, according to an embodiment.

In such a case, a user may desire to use a single-cantilever instantiation, as shown in FIG. 3, in which case, reproducibility in the fabrication of two cantilevers is not required. A single-cantilever instantiation, as shown in FIG. 3, may also be simpler and less expensive to fabricate, as compared to a two-cantilever instantiation, as shown and described with reference to FIGS. 2A and 2B. In addition, the single-cantilever instantiation, as shown in FIG. 3, may use a single-ended lock-in amplifier measurement technique, that is, a measurement technique that is referenced to ground.

According to one example of an operation of the first capacitive deflection-nulling servo system, the first capacitive actuator 240 may be configured to reposition the first microfabricated cantilever 220 through application of electrostatic forces. The electrostatic attraction between the first capacitive actuator 240 and the first microfabricated cantilever 220 provides a non-contact mechanism whereby the position of the first microfabricated cantilever 220 may be controlled. A closed-loop capacitive deflection-nulling servo system may thus be used in accordance with the system 200. In the closed-loop servo system, an offset in the position of the first microfabricated cantilever 220 may be detected by the first detector 230 and corrected using the first capacitive actuator 240, wherein the capacitive actuation provided by the first capacitive actuator 240 operates to reposition the first microfabricated cantilever 220 in a non-contact manner.

In a similar manner, the capacitive actuation provided by the second capacitive actuator 290 operates to reposition the second microfabricated cantilever 270 in a non-contact manner. Thus, in response to a detected offset in the position of the second microfabricated cantilever 270, a voltage is supplied to the second capacitive actuator 290, where the voltage is based upon the detected offset in the position of the second microfabricated cantilever 270. The second detector 280 may be configured to control the magnitude of the voltage supplied to the second capacitive actuator 290, in response to detecting the offset in the position of the second microfabricated cantilever 270.

In addition, the controller 252 may also operate to control the voltage that is supplied to the second capacitive actuator 290. This voltage may be referred to as a second control voltage. For example, the controller 252 may control the voltage that is supplied to the second capacitive actuator 290 by comparing a detected position of the second microfabricated cantilever 270 with a baseline position, determining if there is an offset in the position of the second microfabricated cantilever 270, and supplying an appropriate voltage to correct for the detected offset.

The second control voltage may be amplified by the second buffer amplifier 295 prior to reaching the second capacitive actuator 290. The second capacitive actuator 290 may include a parallel plate that is substantially parallel to an edge 285 of the second microfabricated cantilever 270. In addition, or alternatively, the second capacitive actuator 290 may include a set of interdigitated fingers (not shown) similar in configuration to the fingers 275 of the second microfabricated cantilever 270.

According to one operation of the second capacitive deflection-nulling servo system, the second capacitive actuator 290 may be configured to reposition the second microfabricated cantilever 270 through application of electrostatic forces. The electrostatic attraction between the second capacitive actuator 290 and the second microfabricated cantilever 270 provides a non-contact mechanism whereby the position of the second mirofabricated cantilever 270 may be controlled.

A second closed-loop capacitive deflection-nulling servo system may thus be used in accordance with the system 200. In the second closed-loop servo system, an offset in the position of the second microfabricated cantilever 270 may be detected by the second detector 280 and corrected using the second capacitive actuator 290, wherein the capacitive actuation provided by the second capacitive actuator 290 operates to reposition the second microfabricated cantilever 270 in a non-contact manner.

According to another example of the operation of the system 200, the first detector 230 may be employed to detect the occurrence of a chemical reaction or phase transition inside the first microfabricated cantilever 220. For example, the occurrence of a chemical reaction inside a hollow channel of the first microfabricated cantilever 220 may produce a release or absorption of energy and thus a change in temperature of the first microfabricated cantilever 220. In addition, the change in temperature of the first microfabricated cantilever 220 may, in turn, produce an offset or change in position of the first microfabricated cantilever 220. The offset or change in position, such as a deflection, of the first microfabricated cantilever 220 may be detected by the first detector 230. A signal representing the detected change in position of the first microfabricated cantilever 220 may be communicated to the measurement output module 265 via the first coupling capacitor 185 and the lock-in amplifier 255.

In one example, an AC-coupled measurement technique may be used with the lock-in amplifier 255. An example of a technique using a lock-in amplifier, such as the lock-in amplifier 255, is described in previously filed U.S. patent application Ser. No. 10/969,439, the disclosure of which is incorporated by reference herein in its entirety.

According to another example, a change in temperature of the second microfabricated cantilever 270 may produce an offset or a change in position of the second microfabricated cantilever 270. In response to a detected offset in the position of the second microfabricated cantilever 270, the second control voltage may be supplied, via the second buffer amplifier 295, to the second capacitive actuator 290 to correct for the offset in the position of the second microfabricated cantilever 270. The second control voltage that is supplied to the second capacitive actuator 290 may be measured, via the second coupling capacitor 195 and the lock-in amplifier 255, by the measurement output module 265. In one example, an AC-coupled measurement technique may be used with the lock-in amplifier 255.

In one example, the first microfabricated cantilever 220 and the second microfabricated cantilever 270 may constitute a pair of matched devices, for instance, a pair of matched devices that are fabricated to have substantially similar or identical features and specifications, such as size, dimensions, and other features. As described in further detail below, a two-cantilever system, such as the system 200 shown in FIG. 2A, may also provide substantial sensitivity in detecting heats of reaction due to the occurrence of a chemical reaction or a phase transition.

In one example of an operation of the system 200, the first microfabricated cantilever 220 and the second microfabricated cantilever 270 may be used to detect a change in temperature that occurs as a result of a chemical reaction or a thermally induced phase transition. With reference to the first microfabricated cantilever 220, a test solution, for instance, containing a mixture of chemical reagents may be placed in the interior channel of the first microfabricated cantilever 220. The occurrence of a chemical reaction inside the interior channel may cause a release or absorption of energy and therefore a change in temperature of the first microfabricated cantilever 220. As discussed above, the change in temperature may induce a bending or other change in position of the first microfabricated cantilever 220. The change in position may also depend on the thermal coefficient of expansion of the first microfabricated cantilever 220. The thermal coefficient of expansion may, in turn, depend on the material composition of the first microfabricated cantilever 220. For instance, a cantilever made out of silicon nitride may have a different thermal coefficient of expansion, as compared to a cantilever made out of aluminum oxide or another material.

In order to perform a controlled measurement, a buffer or control solution may be placed in a hollow portion of the second microfabricated cantilever 270. The buffer solution may thus provide a control measurement, for comparing with the measurement of deflection of the first microfabricated cantilever 220. If a change in temperature occurs, due to a chemical reaction or a phase transition within the first microfabricated cantilever 220, than a controlled measurement may thus be provided.

The heat of reaction produced from a chemical reaction or a phase transition in the test solution may induce a bending or other change in position of the first microfabricated cantilever 220. At the same time, in the case of the buffer solution within the second microfabricated cantilever 270, no bending or other change in position may occur. The system 200 may thus provide for the sensitive detection of a change in temperature that occurs as a result of a chemical reaction or thermally induced phase transition.

According to another example, the system 200 may provide an interferometric method of detection based on a change in reflective light intensity of interference maxima as the relative displacement changes between the first microfabricated cantilever 220 and the second microfabricated cantilever 270. For example, interference fringes may be formed between fingers (not shown) on the stationary base 215 and the interdigitated fingers 225 and 275 of the first and second microfabricated cantilevers 220 and 270, respectively. When the fingers 225 and 275 are not deflected, for instance at room temperature, the reflected light intensity from the fingers 225 and 275 may have a maximum value due to constructive interference. However, as the temperature changes due to an increase in temperature, heat evolution, or heat absorption, for example, either the first microfabricated cantilever 220 or the second microfabricated cantilever 270 may change position or deflect in a corresponding manner. As a result, the reflected light intensity will decrease because of a decrease in the constructive interference. In addition to being used for position detection, as described above, the interdigitated fingers 225 and 275 may also be used for capacitive actuation, in order to achieve electrostatic position control.

According to another example, the first microfabricated cantilever 220 and the second microfabricated cantilever 270 may be used to measure heats of reactions that occur at room temperature in an isothermal titration calorimetry (ITC) application. ITC may be used, for instance, to measure the heat of reaction that occurs due to a chemical reaction, such as a binding reaction between two molecules. As the two molecules interact, heat may be released or absorbed. For instance, when a macromolecule is combined with an added ligand, heat may be released or absorbed due to the binding reaction. The binding reaction may thus produce a change in temperature. The first microfabricated cantilever 220 and the second microfabricated cantilever 270 may thus be used, in a manner as described above including a comparison of a test solution in one cantilever with a buffer solution in another cantilever, to measure the heat of reaction that occurs as a result of a chemical reaction, such as the binding reaction between two molecules. Other types of chemical reactions, for instance, drug candidate-protein interactions, may also be studied using the first microfabricated cantilever 220 and the second microfabricated cantilever 270.

The use of a microfabricated cantilever for identifying one or more molecules in a test solution is described in previously filed U.S. patent application Ser. No. 10/969,439, the disclosure of which is incorporated by reference herein in its entirety.

In a further example, the first microfabricated cantilever 220 and the second microfabricated cantilever 270 may be used to detect heats of reactions that occur using differential scanning calorimetry (DSC). With DSC, the stability of a single reagent may be measured by increasing the temperature and observing absorbed or evolved heat. DSC may be used to observe heats of reactions that occur, for instance, due to reagent binding or protein denaturation. DSC may thus involve heating of one or more reagents that are located, for example, in a hollow channel within the first microfabricated cantilever 220, or in a hollow channel within the second microfabricated cantilever 270. Heating of the reagents within the cantilevers may be provided using a second laser diode (not shown).

According to another example, with regard to DSC application, the system 200 provides an electrostatic control mechanism that enables detection of a chemical reaction or a thermally induced phase transition. For a DSC measurement, the temperature of a chemical solution may be increased, within a hollow portion of the first microfabricated cantilever 220. As a result of this temperature increase, or temperature sweep, the evolved or absorbed heat may be detected, for instance, by deflection of the first microfabricated cantilever 220. For the DSC application to occur, there may be a requirement to substantially increase the temperature, for instance, from about 50 degrees Celsius to about 100 degrees Celsius. In the absence of the position-holding mechanism provided by the system 200, a temperature sweep which provides a 50 degrees Celsius change in cantilever temperature may result in a large background deflection of the first microfabricated cantilever 220 and the second microfabricated cantilever 270.

In order to detect a slight or minor deflection in the first microfabricated cantilever 220 or the second microfabricated cantilever 270, as a result of a chemical reaction or a phase transition, the system 200 provides an offset-zeroing system which may hold this large background deflection at approximately zero. Thus, if the temperature is swept slowly and if a heat-emitting phase transition occurs, the temperature change or temperature excursion produced by the heat-emitting phase transition may be detected by the system 200. Thus, a temperature sweep may be performed at a desired rate or speed, for instance at a slow speed, such that a user may detect the occurrence of a phase transition.

For instance, a temperature excursion caused by the heat of a phase transition may result in a slight cantilever deflection. This slight cantilever deflection produced by the phase transition may thus be detected, because the otherwise large background deflection produced by the DSC temperature sweep is essentially held to zero by the system 200. Thus, the system 200 operates to null the background deflection so that a high gain may be used to observe minor or slight offset deflections due, for example, to a chemical reaction or a phase transition. In addition, the system 200 also operates to provide an error output signal which may be used to monitor the absorbed or evolved heat as a result of the chemical reaction or the phase transition. Thus, the system 200 provides a nulling circuit that operates during a DSC scanning measurement.

According to another example, a deflection of either the first microfabricated cantilever 220 or the second microfabricated cantilever 270 may also be detected by sensing the motion of reflected light, for instance a reflected laser beam, on a detector, such as a four-quadrant position-sensitive detector (not shown). The light, such as a laser beam, may be provided using a light source, such as the light source 205. The light may be directed upon either of the first microfabricated cantilever 220 or the second microfabricated cantilever 270, and the motion of the reflected light is detected by the detector. With the four-quadrant position-sensitive detector, the position of an end of the first microfabricated cantilever 220 or the position of an end of the second microfabricated cantilever 270 may be monitored by measuring the output voltages of the four-quadrant position-sensitive detector. Alternatively, a deflection of either the first microfabricated cantilever 220 or the second microfabricated cantilever 270 may be detected using another suitable interferometric method in conjunction with the closed-loop capacitive deflection-nulling servo system as described above.

Referring to FIG. 3, there is shown a differential scanning calorimeter system 300 including a single microfabricated cantilever 220. The system 300 is one, more detailed, example of the system 100 shown in FIG. 1. If exact or substantially exact device-to-device reproducibility of two cantilevers is not attained, the instantiation of the single microfabricated cantilever 220 in FIG. 3 may be desired. A single-cantilever instantiation, as shown in FIG. 3, may also be simpler and less expensive to fabricate, as compared to a two-cantilever instantiation, as shown and described with reference to FIG. 2A.

As shown, the microfabricated cantilever 220 is attached or affixed to a base 315. The base 315 may include a fixed or stationary base attached to one end of the microfabricated cantilever 220. The base 315 may be fabricated from a suitable integrated circuit material, for instance, silicon, silicon oxide or silicon nitride. The base 315 may also be fabricated using a material having a low thermal conductance. In addition to the microfabricated cantilever 220, the other like-numbered reference numerals, as described above with reference to FIG. 2A, also apply with reference to FIG. 3.

Furthermore, the detailed description set forth above, with regard to the microfabricated cantilever 220, the detector 230, and other like-numbered reference numerals, also applies to the detailed description of FIG. 3. For instance, a closed-loop capacitive deflection-nulling servo system, as described in detail above, the microfabricated cantilever 220 may be used to detect heats of reactions that occur using ITC and DSC applications. A bonding technique or other suitable technique may be used to attach one end of the microfabricated cantilever 220 to the base 315.

Heating of reagents within the microfabricated cantilever 220 may be provided using a second laser diode (not shown). Moreover, one skilled in the art will recognize that the system 300 may include other features or components in addition to those shown and described with reference to FIG. 3.

A signal representing the detected change in position of the microfabricated cantilever 220 may be communicated to the measurement output module 265 through the coupling capacitor 185 and the lock-in amplifier 255. The one cantilever system 300, as shown in FIG. 3, has a single-ended lock-in amplifier 255, that is, the lock-in amplifier 255 is referenced to ground. As described above, an AC-coupled measurement technique may be used with the lock-in amplifier 255. During a DSC measurement, an AC modulation frequency may be higher, for instance, up to five times higher, than the response time of a closed-loop capacitive deflection-nulling servo system, such that a signal may be detected and measured before the signal is nulled.

Figure 4:
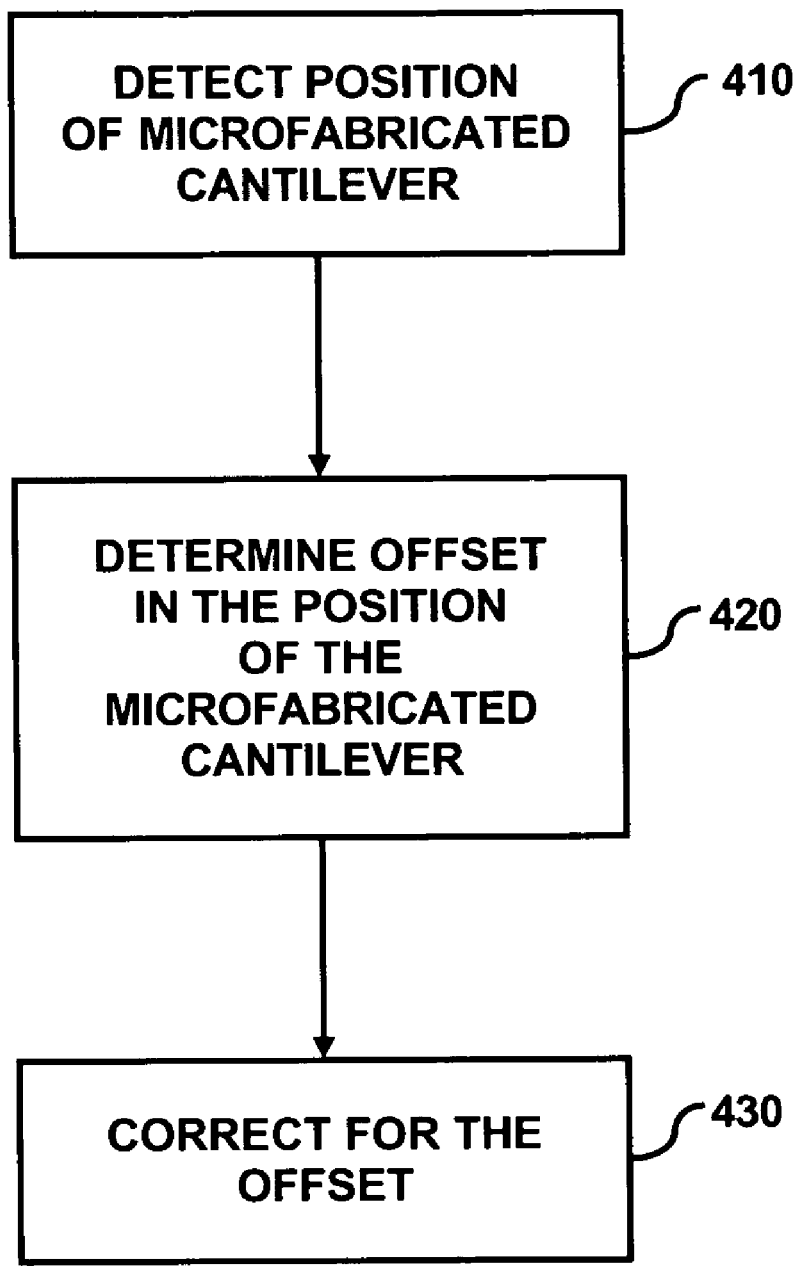
FIG. 4 shows a flowchart for correcting for the offset in the position of a microfabricated cantilever, according to an embodiment.

Referring to FIG. 4, a flowchart 400 is shown illustrating a method of correcting for an offset in the position of the first microfabricated cantilever 220 or the second microfabricated cantilever 270. At step 410, a position of the first microfabricated cantilever 220 is detected. In another example, the position of the second microfabricated cantilever 270 may be detected. As described in detail above, the first detector 230 and the second detector 280 may be used to detect a position of the first microfabricated cantilever 220 and the second microfabricated cantilever 270, respectively.

At step 420, a determination is made as to whether there is an offset in the position of the first microfabricated cantilever 220 or the second microfabricated cantilever 270. As described in detail above, in one example, a determination may be made as to whether there is an offset in the position of the first microfabricated cantilever 220 during a DSC measurement. For a DSC measurement, as further described in detail above, the temperature of a chemical solution may be increased above the scan temperature within a hollow portion of the first microfabricated cantilever 220. As a result of this temperature increment above the temperature sweep, the evolved or absorbed heat may be detected by a deflection of the first microfabricated cantilever 220. In the absence of the position-holding mechanism, the temperature sweep during a DSC measurement may result in a large background deflection of the first microfabricated cantilever 220. In order to detect a slight or minor deflection in the first microfabricated cantilever 220, as a result of a chemical reaction or a phase transition, the offset-zeroing system may hold this large background deflection produced by the temperature sweep at approximately zero. Therefore, if the temperature is swept slowly and if a heat-emitting chemical reaction or heat-emitting phase transition occurs, the temperature excursion produced by the chemical reaction or the phase transition may be detected.

At step 430, correction is made for the offset in the position of the microfabricated cantilever 220 or 270. For example, as described in detail above, the first closed-loop capacitive deflection-nulling servo system may be used to correct for the offset in the position of the first microfabricated cantilever 220. In like manner, as described above, the second closed-loop capacitive deflection-nulling servo system may be used to correct for the offset in the position of the second microfabricated cantilever 270.

Figure 5:
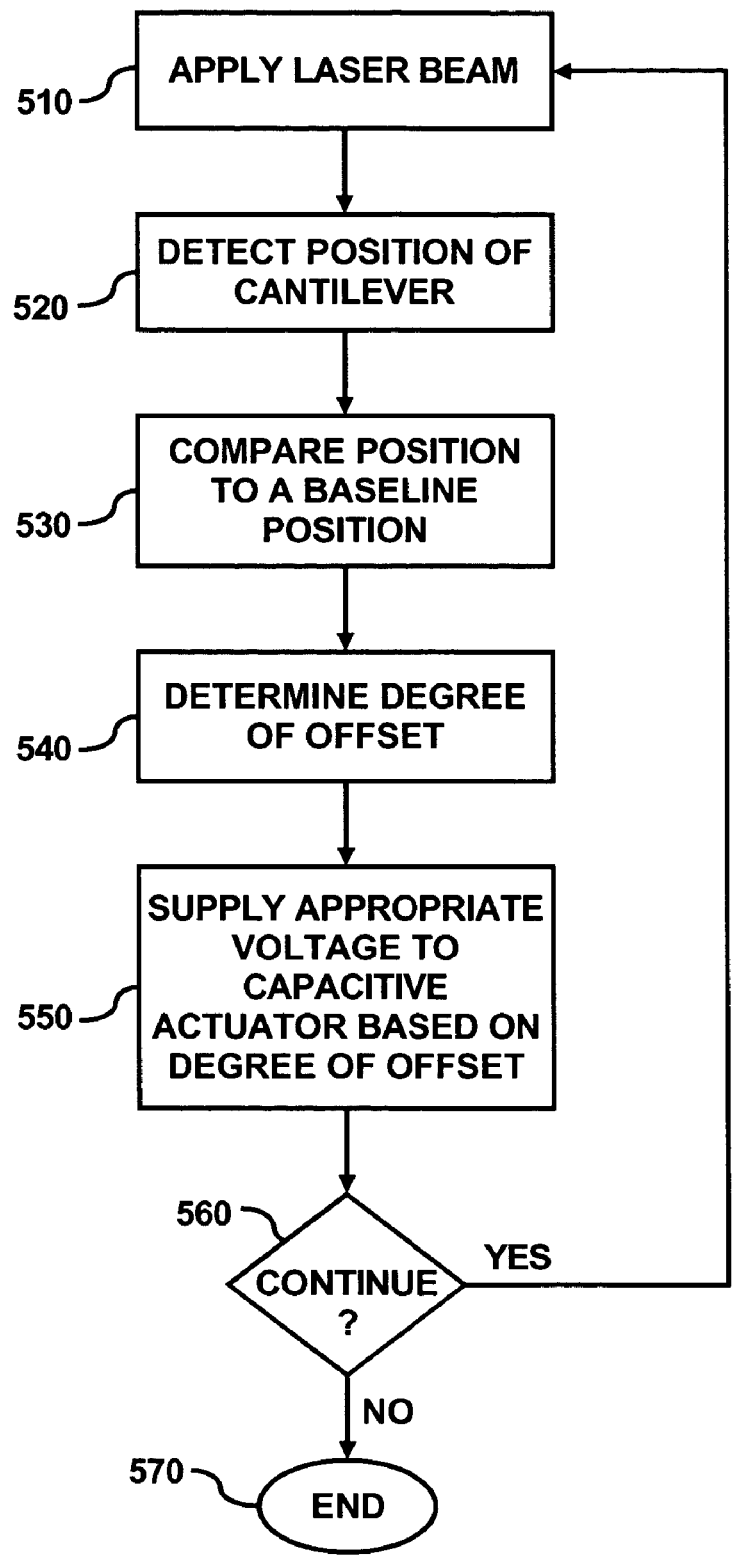
FIG. 5 shows a flowchart for correcting for the offset in the position of a microfabricated cantilever using a capacitive actuator, according to an embodiment.

Referring to FIG. 5, a flowchart 500 is shown for correcting for the offset in the position of a microfabricated cantilever. For instance, the flowchart 500 describes a process of correcting for an offset in the position of the second microfabricated cantilever 270 using the second capacitive actuator 290. It should, however, be understood that the process described herein is also applicable to correcting for an offset in the position of the first microfabricated cantilever 220 using the first capacitive actuator 240.

At step 510, light 260 from the light source 205, such as a laser beam from the light source 205, is applied to the second microfabricated cantilever 270. At step 520, the position of the second microfabricated cantilever 270 is detected as determined from the received light 260. As described in detail above, with reference to FIGS. 2 and 3, the second detector 280 may include at least one optical sensor which may be used to detect the position of the second microfabricated cantilever 270 based, for instance, on the received light 260.

At step 530, the detected position of the second microfabricated cantilever 270 is compared with a baseline position through use of, for instance, a comparator (not shown). The comparator is configured to output a voltage having a magnitude equal to the difference in the detected position and the baseline position. In this regard, the comparator may be considered as determining a degree of offset in second microfabricated cantilever 270 at step 540. In addition, the outputted voltage may be supplied to the capacitive actuator 290 to cause the microfabricated cantilever 270 to be repositioned at step 550. After correcting for the offset by supplying an appropriate voltage, at step 550, a query is submitted at step 560 as to whether the process should be repeated. If a new process is to begin, the process may be repeated, beginning at step 510. If, however, the process is not to be repeated, the process ends at step 570.

According to one example, and as described in detail above, the method 500 may be employed to correct for an offset in the detected position of the second microfabricated cantilever 270 during a DSC measurement. As described above, the second closed-loop capacitive deflection-nulling servo system may be used to null or cancel a large background deflection of the second microfabricated cantilever 270 that is produced by an increase in temperature, or a temperature sweep, during the DSC measurement. Therefore, the second closed-loop capacitive deflection-nulling servo system enables use of a high gain to observe minor or slight offset deflections that are produced, for example, by a heat-emitting chemical reaction or heat-emitting phase transition.

What has been described and illustrated herein are embodiments along with some variations. While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A microfabricated cantilever detection system comprising:
   a first hollow, temperature sensitive, bimorph, microfabricated cantilever forming a reaction chamber, the first microfabricated cantilever having a plurality of laterally disposed projections for receiving light from a light source;
   a first device, including a light source for directing light to the projections and a light detector, operable to detect a position of the microfabricated cantilever, wherein the first device is operable to determine the position of the microfabricated cantilever;
   a second device operable to reposition the microfabricated cantilever;
   a second hollow, temperature sensitive, bimorph, microfabricated cantilever forming a reaction chamber, the second microfabricated cantilever having a plurality of laterally disposed projections for receiving light from a light source, the projections of the first microfabricated cantilever lacking interdigitation with and being spaced from the projections of the second microfabricated cantilever;
   a third device, including a light source for directing light to the projections of the second cantilever, operable to detect a position of the second microfabricated cantilever, wherein the third device is operable to determine an offset in the position of the second microfabricated cantilever; and
   a fourth device operable to reposition the second microfabricated cantilever.

2. The system of claim 1, wherein the first and second microfabricated cantilevers are each coated on at least one side with a film.

3. The system of claim 1, wherein the first and third devices are operable to detect at least one thermally induced change in the position of the cantilevers.

4. The system of claim 1, wherein the second and fourth devices operable to reposition the first and second microfabricated cantilevers comprise a capacitive deflection-nulling servo systems having capacitive actuators, wherein the capacitive actuators are configured to reposition the microfabricated cantilevers through application of electrostatic forces, and wherein the first and third devices are configured to control the magnitude of voltages supplied to the capacitive actuators, wherein the voltages are based upon the detected offsets.

5. The system of claim 4, wherein the magnitude of the voltages supplied to the capacitive actuators are operable to hold deflections of the microfabricated cantilevers to approximately zero.

6. The system of claim 5, wherein the magnitudes of the voltages supplied to the capacitive actuators are operable to hold the deflections to approximately zero during an increase in temperature for a differential scanning calorimetry measurement.

7. A method of positioning a hollow, temperature sensitive, bimorph, microfabricated cantilever forming a reaction chamber, the microfabricated cantilever having a plurality of non-interdigitated laterally disposed projections for receiving light from a light source, said method comprising:
   detecting a position of the at least one microfabricated cantilever by directing light from the light source onto the projections.
   determining an offset in the position of the at least one microfabricated cantilever by using a light detector; and
   correcting the offset.

8. The method of claim 7, wherein determining an offset in the position of the microfabricated cantilever further comprises:
   determining a baseline position of the microfabricated cantilever; and
   comparing the position detected with the baseline position.

9. The method of claim 7, wherein correcting for the offset further comprises supplying a voltage to a capacitive actuator, wherein the voltage is based upon the determined offset.

10. The method of claim 9, further comprising:
    supplying the voltage to the capacitive actuator to hold a deflection of the microfabricated cantilever to approximately zero.

11. The method of claim 10, further comprising supplying the voltage to the capacitive actuator to hold the deflection to approximately zero during an increase in temperature for a differential scanning calorimetry measurement.

12. A method of detecting a chemical reaction in a hollow, temperature sensitive, bimorph, microfabricated cantilever forming a reaction chamber, the cantilever having a plurality of laterally disposed non-interdigitated projections for receiving light from a light source, the method comprising the steps of:
    detecting a first position of a first microfabricated cantilever by directing light from the light source onto the projections;
    determining a first offset in the first position of the first microfabricated cantilever by using a light detector;
    correcting the first offset; and
    determining an occurrence of a chemical reaction based on the first offset.

13. The method of claim 12, wherein determining a first offset in the first position of the first microfabricated cantilever further comprises:
increasing a temperature during a temperature sweep;
nulling a background deflection produced during the temperature sweep; and
determining the first offset during the temperature sweep.

14. The method of claim 13, further comprising:
adjusting an AC modulation frequency;
performing a differential scanning calorimetry measurement;
nulling the background deflection with a closed-loop capacitive deflection-nulling servo system during the differential scanning calorimetry measurement; and
determining the occurrence of at least one phase transition during the differential scanning calorimetry measurement.

15. The method of claim 12, wherein determining a first offset in the first position of the first microfabricated cantilever further comprises:
determining a baseline position of the first microfabricated cantilever; and
comparing the first position detected with the baseline position.

16. The method of claim 15, wherein comparing the first position detected with the baseline position comprises the step of comparing the first position with an AC-coupled lock-in detection system.

17. The method of claim 12, wherein correcting for the first offset comprises the step of correcting for the first offset with a capacitive actuator.

18. The method of claim 17, further comprising the step of supplying a voltage to the capacitive actuator to hold a background deflection of the first microfabricated cantilever to approximately zero during a differential scanning calorimetry measurement.

19. The method of claim 18, wherein determining an occurrence of a chemical reaction based on the first offset further comprises the step of determining at least one of a change in temperature and evolved heat of a phase transition.

20. The method of claim 12, further comprising the steps of:
placing a control solution in the first microfabricated cantilever;
placing a test solution in a second hollow, temperature sensitive, bimorph, microfabricated cantilever forming a reaction chamber, the second cantilever having a plurality of laterally disposed non-interdigitated projections for receiving light from a light source;
detecting a second position of the second microfabricated cantilever;
determining a second offset in the second position; and
determining an occurrence of a phase transition in the test solution based on a comparison of the first offset relative to the second offset.

* * * * *

UNITED STATES PATENT AND TRADEMARK OFFICE
CERTIFICATE OF CORRECTION

PATENT NO. : 7,372,026 B2  Page 1 of 1
APPLICATION NO. : 11/128661
DATED : May 13, 2008
INVENTOR(S) : Alison Chaiken et al.

It is certified that error appears in the above-identified patent and that said Letters Patent is hereby corrected as shown below:

In column 14, line 30, in Claim 7, after "projections" delete "." and insert -- ; --, therefor.

Signed and Sealed this

Thirtieth Day of September, 2008

JON W. DUDAS
*Director of the United States Patent and Trademark Office*